A. WILLEY.
SAW-SWAGES.
No. 182,395. Patented Sept. 19, 1876.
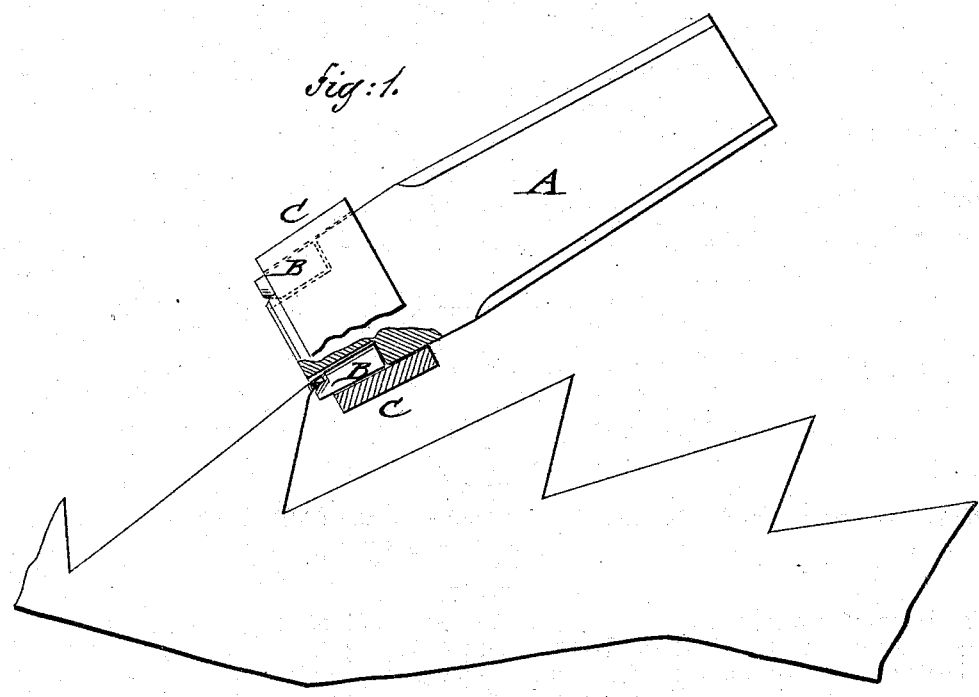
Fig. 1.
Fig. 2.
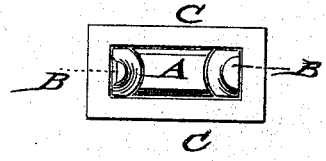
WITNESSES:
Chas. N Jota
John Goethals
INVENTOR:
A. Willey
BY
ATTORNEYS.

UNITED STATES PATENT OFFICE.

ASHER WILLEY, OF ROCHESTER, MISSOURI.

IMPROVEMENT IN SAW-SWAGES.

Specification forming part of Letters Patent No. 182,395, dated September 19, 1876; application filed August 21, 1876.

*To all whom it may concern:*

Be it known that I, ASHER WILLEY, of Rochester, Andrew county, Missouri, have invented a new and Improved Saw-Swage, of which the following is a specification:

Figure 1 represents a side elevation, partly in section, of my improved saw-swage; and Fig. 2, an end view of the same.

Similar letters of reference indicate corresponding parts.

The object of my invention is to provide an improved swage, by which a saw-tooth is readily formed of such a shape that less power in running the saw is required, and that the wood is cut in a smooth and even manner, instead of being torn.

The invention consists of a recessed stock, provided with shaping-dies of different curvatures, that are set into the recesses of the stock, and locked by an inclosing sleeve.

In the drawing, A represents the stock of my improved saw-swage, which is made with a slight taper at the end, and recessed at opposite points for inserting one or more tooth-shaping dies, B. The dies and recesses of the stock are curved, the ends of the dies being made half conical, the bevel being made of varying inclination, so as to produce by the swage a tooth of greater or less cutting-power. A sliding sleeve, C, that corresponds to the tapering end of the stock, locks the dies rigidly in position in the recesses of the stock.

The swage is applied to the tooth in the manner shown in Fig. 1, and driven by a mallet on the same, so that a cutting-edge corresponding to the curvature of the shaping-die is formed, and thereby a tooth of greater or less cutting-power obtained.

The swage forms projecting cutting-edges at both sides of the tooth, which are concaved in the same manner as the die. The sawing is thereby accomplished with less power than with the common square tooth, and a more even and smoother cut is produced.

Having thus described my invention, I claim as new and desire to secure by Letters Patent—

A swage for shaping saw-teeth composed of a stock, with tapering and recessed end, one or more curved shaping-dies, and a locking-sleeve, substantially as specified.

ASHER WILLEY.

Witnesses:
JACOB V. BUSEY,
PHILLIP SIEGRIST.